(12) United States Patent  
Clarke, II et al.

(10) Patent No.: US 9,330,094 B2  
(45) Date of Patent: May 3, 2016

(54) RAAF MERGER, ACQUISITION, DIVESTITURE METHODOLOGY

(71) Applicant: T.G.R. Group, Inc., Los Angeles, CA (US)

(72) Inventors: Ernesto Santiago Clarke, II, Pearland, TX (US); Kyle Anthony Pourciau, Houston, TX (US)

(73) Assignee: T.G.R. Group, Inc., Los Angeles, CA (US)

( * ) Notice: Subject to any disclaimer, the term of this patent is extended or adjusted under 35 U.S.C. 154(b) by 244 days.

(21) Appl. No.: 13/629,822

(22) Filed: Sep. 28, 2012

(65) Prior Publication Data

US 2014/0095431 A1    Apr. 3, 2014

(51) Int. Cl.  
*G06F 17/30* (2006.01)

(52) U.S. Cl.  
CPC .......... *G06F 17/30* (2013.01); *G06F 17/30557* (2013.01); *G06F 17/30371* (2013.01); *G06F 17/30575* (2013.01)

(58) Field of Classification Search  
CPC ... G06F 17/00; G06F 17/30; G06F 17/30368; G06F 17/30563; G06F 17/30569; G06F 17/30705; G06F 17/30861; G06F 17/3089; G06F 17/30371; G06F 17/30575  
USPC .......................................... 707/610, 655, 635  
See application file for complete search history.

(56) References Cited

U.S. PATENT DOCUMENTS

| | | | |
|---|---|---|---|
| 6,675,178 B1 * | 1/2004 | Chinchar et al. | 707/655 |
| 7,562,102 B1 * | 7/2009 | Sumner et al. | |
| 8,225,057 B1 * | 7/2012 | Zheng et al. | 711/162 |
| 2002/0099583 A1 * | 7/2002 | Matusek et al. | 705/7 |
| 2002/0199025 A1 * | 12/2002 | Kutay et al. | 709/250 |
| 2004/0194112 A1 * | 9/2004 | Whittenberger et al. | 719/310 |
| 2006/0015619 A1 * | 1/2006 | Tse et al. | 709/226 |
| 2007/0130106 A1 * | 6/2007 | Gadiraju | 707/2 |
| 2014/0201101 A1 * | 7/2014 | Morrison | 705/342 |

* cited by examiner

*Primary Examiner* — Usmaan Saeed  
*Assistant Examiner* — Fariborz Khoshnoodi

(57) ABSTRACT

Different advantageous embodiments provide for data separation and data integration. A customizable toolset is implemented on an enterprise resource planning system to selectively purge or mask data in a replicated database.

11 Claims, 4 Drawing Sheets

RAAF MERGER, ACQUISITION, DIVESTITURE METHODOLOGY

BACKGROUND

Mergers, acquisitions, and divestiture initiatives require strategic planning and action from information technology departments. Identifying the business scope, understanding the timeframe, and understanding the resources required are just some of the key factors in achieving a successful merger and acquisition or divestiture.

Thorough enterprise resource system due diligence is important to the success of divestitures. The analysis of the master and transactional data can determine the level of sensitivity and complexity needed in data separation, for instance. This analysis can be both costly and time consuming. Once the business scope is defined, a divestiture will rely on the execution of the information technology organization, as well as the synergy between business units, information technology infrastructure, enterprise resource planning systems, and external interfaces.

Accordingly, it would be advantageous to have a system and method for providing a flexible and adaptable model that delivers an efficient and cost-effective solution to address these and other issues.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a system for data separation. The system includes one or more processors, an enterprise resource planning system, and a customizable toolset. The enterprise resource planning system is implemented on the one or more processors. The customizable toolset is implemented on the enterprise resource planning system. The customizable toolset is configured to process data to purge a first subset of the data or mask a second subset of the data or both purge the first subset of the data and mask the second subset of the data. The customizable toolset includes a configuration table and a class of programs.

Another aspect is directed towards a system for data integration. The system includes one or more processors, an enterprise resource planning system, and a customizable toolset. The enterprise resource planning system is implemented on the one or more processors. The customizable toolset is implemented on the enterprise resource planning system and is configured to integrate a first set of data and a second set of data to generate a third set of data.

Other advantages may become apparent from the following detailed description when taken in conjunction with the drawings.

BRIEF DESCRIPTION OF THE DRAWINGS

The present invention is illustrated by way of example and not limited in the accompanying figures, in which like reference numerals indicate similar elements. The advantageous embodiments, as well as a preferred mode of use, further objectives and advantages thereof, will best be understood by reference to the following detailed description of an advantageous embodiment of the present disclosure when read in conjunction with the accompanying drawings, wherein.

DETAILED DESCRIPTION

Various aspects of the technology described herein are generally directed towards an integrated enterprise resource planning system approach using database level replication technology with a hybrid approach between data masking and data purging.

While the various aspects described herein are exemplified with an enterprise environment directed towards implementation on the SAP® enterprise resource planning (ERP) platform, it will be readily appreciated that other platforms may be utilized with the technology described herein. SAP® is a registered trademark of SAP AG in Germany and in several other countries.

Thus, as will be understood, the technology described herein is not limited to any type of environment or platform for the dissemination and integration of information. As such, the present invention is not limited to any particular embodiments, aspects, concepts, protocols, structures, functionalities or examples described herein. Rather, any of the embodiments, aspects, concepts, protocols, structures, functionalities or examples described herein are non-limiting, and the present invention may be used in various ways that provide benefits and advantages in integration and separation of data and information.

Figure 1:
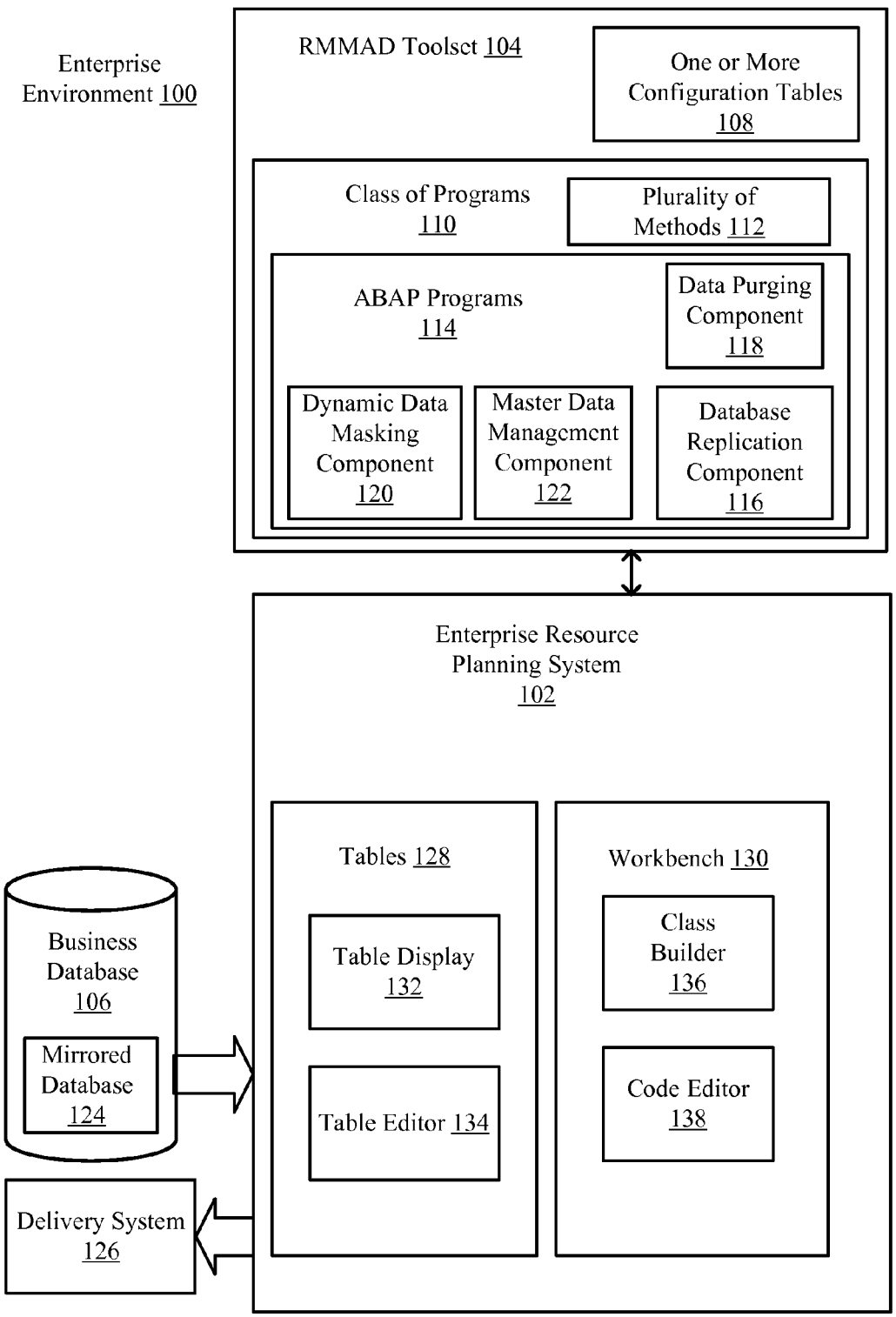
FIG. 1 is an illustrative example of an enterprise environment in which an advantageous example embodiment may be implemented.
Figure 2:
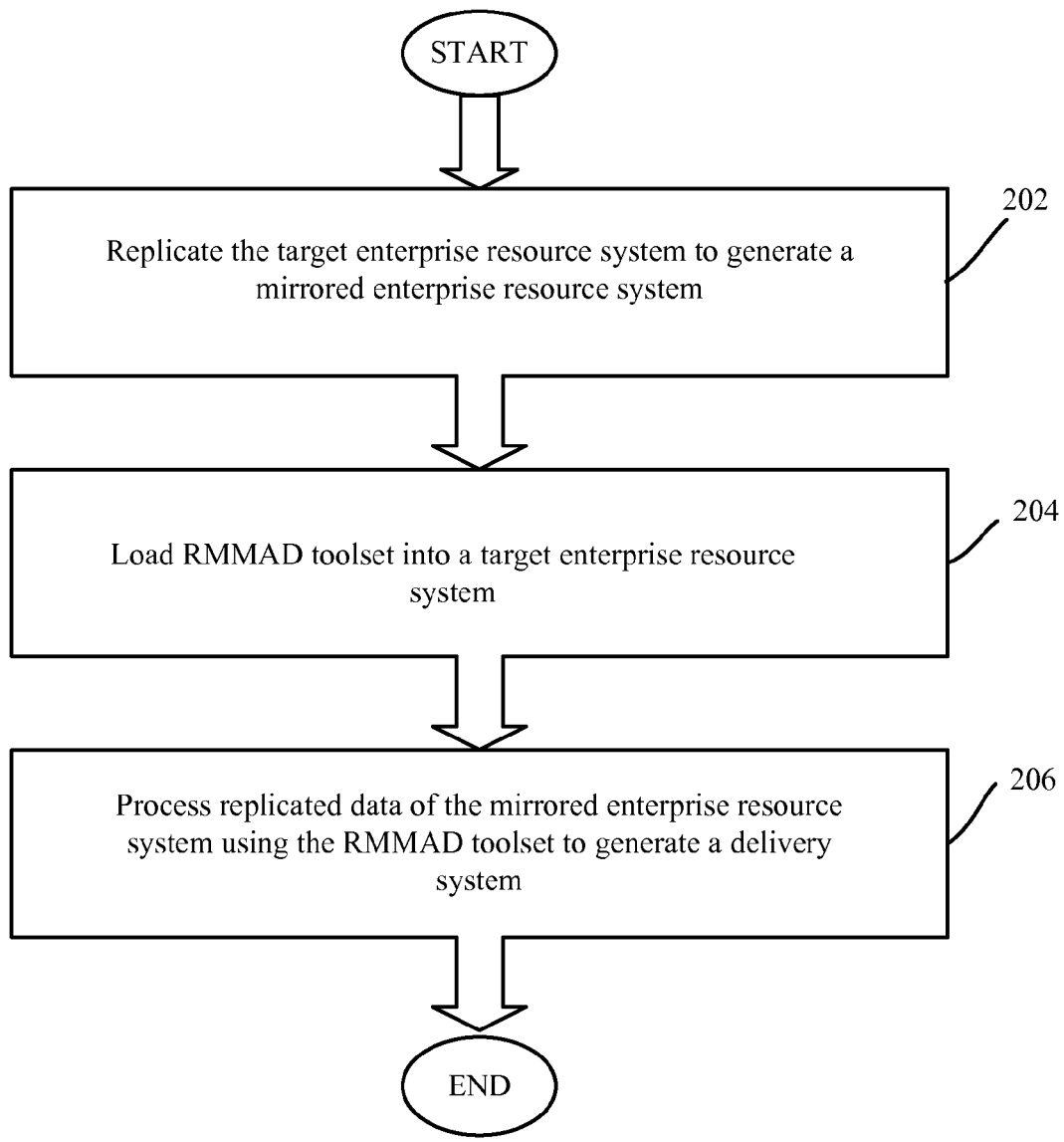
FIG. 2 is a flow diagram representative of example steps in providing a delivery system in accordance with an advantageous example embodiment.

With reference now to the figures and in particular with reference to FIGS. 1-2, diagrams of data processing environments are provided in which advantageous embodiments of the present invention may be implemented. It should be appreciated that FIGS. 1-2 are only illustrative and are not intended to assert or imply any limitation with regard to environments in which different embodiments may be implemented. Many modifications to the depicted environments may be made.

FIG. 1 is an illustration of an example enterprise environment in which advantageous embodiments of the present invention may be implemented. The enterprise environment 100 may be implemented using a data processing system in this illustrative example. As described herein, the enterprise environment 100 includes an enterprise resource planning system 102 and a Repeatable Auditable Anticipatory Flexible (RAAF) Model Merger Acquisition Divestiture (RMMAD) toolset 104. The enterprise environment 100 may also include a business database 106, which may be a collection of data across one or more business units including, without limitation, customer inventory, vendor information, sales information, plant maintenance, production planning, quality management, financial data, and/or any other suitable business data, for example.

The RMMAD toolset 104 is an object class with several methods, an associated configuration table, and Advanced Business Application Programming (ABAP) programs grouped under the same development package. The RMMAD toolset 104 can be implemented on the enterprise resource planning system 102 to automate and customize data separation and/or data integration tasks that may correspond to merger and acquisition workflows and/or divestiture workflows within one or more business units. The RMMAD toolset 104 may include one or more configuration tables 108 and a class of programs 110. The one or more configuration tables 108 are one or more customizable configuration tables that inherently captures business logic from the business database 106. The one or more configuration tables 108 may be modified to store obfuscated values customized for a specific client, or company, for example. The one or more configuration tables 108 may also by modified to store flags that indicate whether certain records, or types of records, are to be purged or obfuscated in the delivery system 126. In one advantageous embodiment, the one or more configuration tables 108 are customized Zmatrices.

In an illustrative example, a customized Zmatrice, or customized configuration table, may identify one or more field values associated with content that is to be purged from the delivery system. In this illustrative example, the table may identify field values "5010," "sales order number," and "PURGE," which indicates that every sales order record with a company code value of "5010" that includes a given sales order number should be purged from the delivery system.

In an illustrative example, a first configuration table may have a flag field to indicate whether a record is intended for the acquiring or selling company. If the record is for the selling entity, the flag indicates that the record is to be purged. If a particular record has integration points with one or more other records, the one or more other records are not to be purged, and the number of integration points with the one or more other records is above a certain threshold, the flag may indicate that the record is to be masked, or obfuscated. As used herein, record may include any type of data, including a document, a report, an entry, a file, an invoice, a communication, and/or any other suitable type of business record.

The class of programs 110 includes a plurality of methods 112 configured to invoke ABAP programs 114 on the enterprise resource planning system 102, leveraging the customized content of the one or more configuration tables 108 associated with the class of programs 110. The class of programs 110 may include a database replication component 116, data purging component 118, a dynamic data masking component 120, and a master data management component 122.

The database replication component 116 may be configured to replicate the business database 106 to create a mirrored database 124 for use by the class of programs 110. In one illustrative implementation, the mirrored database 124 may be manipulated by the enterprise resource planning system 102 using the RMMAD toolset 104 to produce the delivery system 126. The delivery system 126 is a new replicated ERP database system that maintains the same business process configuration for daily operations, but may have less data and/or some records that are masked due to the requirements for sensitive data determined by the respective acquiring and selling companies.

The data purging component 118 deletes a subset of data within the mirrored database 124 based on the one or more configuration tables 108. For example, a subset of data including proprietary information unrelated to the one or more business units being acquired or divested may be purged from the mirrored database 124. The one or more configuration tables 108 may identify the types of data, or the specific data, that are to be purged by the data purging component 118. The dynamic data masking component 120 masks a subset of data within the mirrored database 124 based on the one or more configuration tables 108. For example, a set of data within the mirrored database 124 may contain proprietary information integrated with non-proprietary information, and the subset of data corresponding to the proprietary information may be masked, or vitiated, in the mirrored database 124. Masking data may include, for example, without limitation, obscuring specific elements of data within a data store to replace sensitive data with realistic but not real data.

The master data management component 122 comprises a data integration component that integrates data from the business database 110 and another database (not shown) while eliminating data redundancies and inconsistencies. The master data management component 122 may be implemented in a merger and acquisition scenario when two or more business units are being integrated together, for example. In this illustrative implementation, the delivery system 126 is an integrated system comprising the data from business database 110 and the one or more other databases.

In one illustrative implementation, the enterprise resource planning system 102 is built upon the SAP® ERP platform. The enterprise resource planning system 102 may include tables 128 and a workbench 130. The tables 128 may be one or more configuration tables and controls, such as, without limitation, a table display 132 and a table editor 134. The table display 132 is configured to display the one or more configuration tables 108 associated with the enterprise resource planning system 102. The table editor 134 is configured to allow storage of data, such as the one or more configuration tables 108 from the RMMAD toolset 104, for example.

The Workbench 130 is a collection of tools for building and editing programs that run on the enterprise resource planning system 102. The workbench 130 may include a class builder 136 and a code editor 138. The class builder 136 stores one or more classes of programs that may be executed on the enterprise resource planning system 102. The class builder 136 includes a built-in code editor, which may be used for Object Oriented Code. The code editor 138 is configured to provide editing control of the one or more classes of programs stored within the workbench 130. In an illustrative implementation, the class of programs 110 is loaded into the workbench 130 using the class builder 136, and is customized using the code editor 138, for example.

FIG. 1 is intended as an example, and not as an architectural limitation for different embodiments. For example, in other advantageous embodiments, the RMMAD toolset 104 may be implemented directly within the enterprise resource planning system 102 in the enterprise environment 100.

The different advantageous embodiments recognize and take into account that current methodologies in divestiture processes use a data distillery and migration approach, in which specific sets of data are extracted from the selling entity's production system and copied or loaded into the acquiring entity's system. Data migration can often take six to eight months to execute with this type of approach, and can still result in missing configuration and settings data, missing master and transactional data, primary and secondary table inconsistencies, missing system enhancements, missing table indices, insufficient testing simulations, and insufficient customization.

Thus, various aspects of the subject matter described herein are directed towards a system for data separation. The system includes one or more processors, an enterprise resource planning system, and a customizable toolset. The enterprise resource planning system is implemented on the one or more processors. The customizable toolset is implemented on the enterprise resource planning system. The customizable toolset is configured to process data to purge a first subset of the data or mask a second subset of the data or both purge the first subset of the data and mask the second subset of the data. The customizable toolset includes a configuration table and a class of programs.

Another aspect is directed towards a system for data integration. The system includes one or more processors, an enterprise resource planning system, and a customizable toolset. The enterprise resource planning system is implemented on the one or more processors. The customizable toolset is implemented on the enterprise resource planning system and is configured to integrate a first set of data and a second set of data to generate a third set of data.

With reference now to FIG. 2, an illustration of a flow diagram of providing a delivery system is depicted in which advantageous embodiments of the present invention may be implemented. The flow diagram in FIG. 2 represents an example process that may be implemented by an enterprise resource system using a RMMAD toolset, such as RMMAD toolset 104 in FIG. 1.

The process begins by replicating the target ERP system to generate a mirrored ERP system (step 202). The mirrored system may include a mirrored database, such as mirrored database 124 in FIG. 1, for example, with replicated data from the target ERP system.

The process then loads the RMMAD toolset into a target enterprise resource planning (ERP) system (step 204). The target ERP system may be, for example, enterprise resource planning system 102 in FIG. 1. In one illustrative example, the target ERP system is a system of a company or business unit being sold, or divested. The RMMAD toolset may be, for example, the RMMAD toolset 104 in FIG. 1.

The process then processes the replicated data of the mirrored ERP system using the RMMAD toolset to generate a delivery system (step 206), with the process terminating thereafter.

FIG. 2 is intended as an example, and not as an architectural limitation for different embodiments. For example, in other advantageous embodiments, the toolset may be executed using any other number of steps in any other order of implementation.

Figure 3:
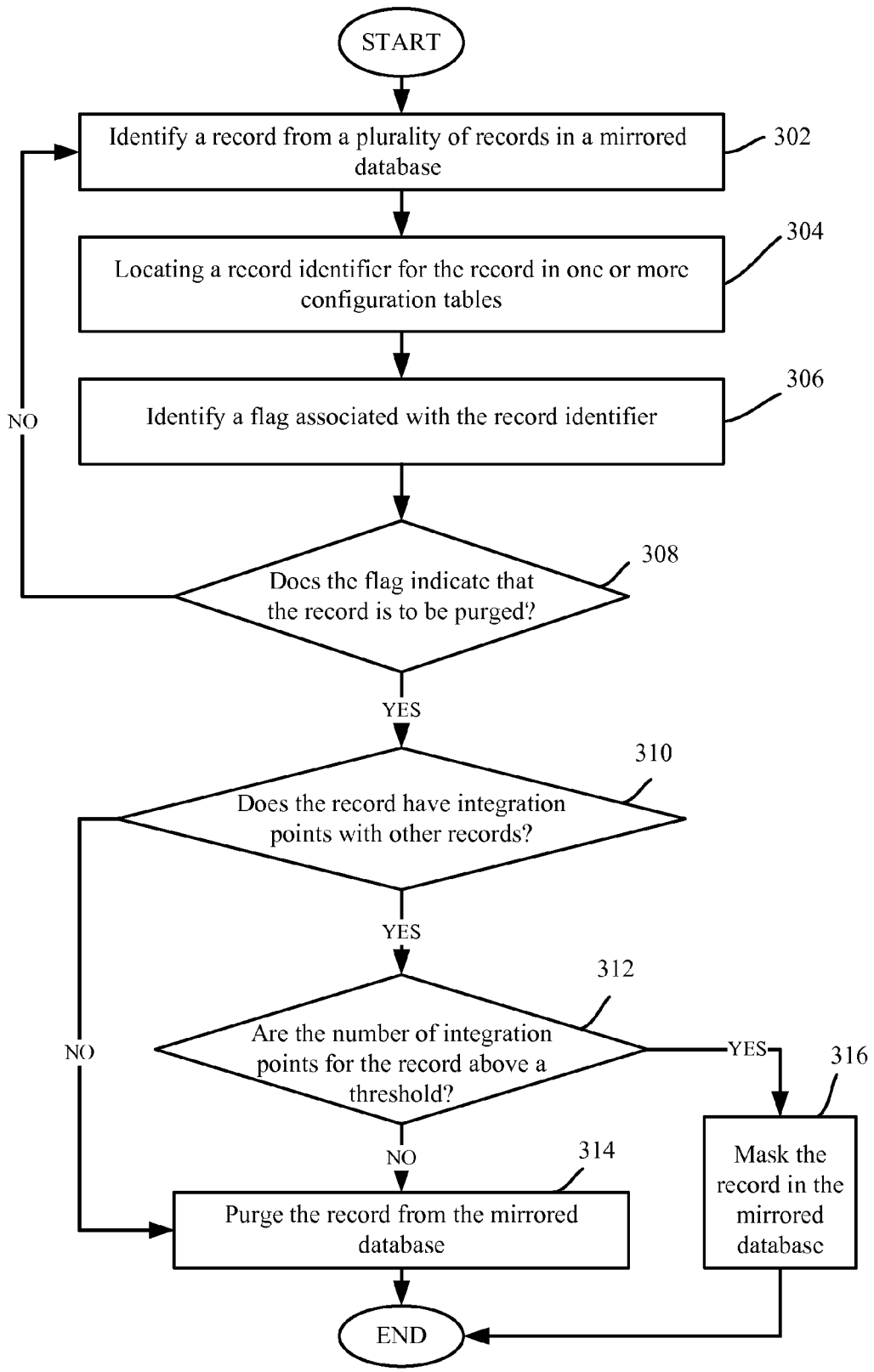
FIG. 3 is a flow diagram representative of example steps in processing a replicated enterprise resource planning system in accordance with an advantageous example embodiment.

With reference now to FIG. 3, an illustration of a flow diagram of processing a replicated enterprise resource planning system is depicted in which advantageous embodiments of the present invention may be implemented. The flow diagram in FIG. 3 represents an example process that may be implemented by an enterprise resource system using a RMMAD toolset, such as RMMAD toolset 104 in FIG. 1.

The process begins by identifying a record from a plurality of records in a mirrored database (step 302). The mirrored database may be part of a replicated enterprise resource system, as described in FIG. 2 above, for example.

The process accesses a record identifier for the record in one or more configuration tables (step 304). The one or more configuration tables may be an illustrative example of the one or more configuration tables 108 in FIG. 1. Each record in the mirrored database may have a unique record identifier stored in the one or more configuration tables, for example.

The process identifies a flag associated with the record identifier (step 306). The flag may indicate whether a record is to be purged or masked, or whether the record is intended for the acquiring company or the selling company, for example.

The process determines whether the flag indicates that the record is to be purged (step 308). If a determination is made that the record is not to be purged, the process may return to step 302, and process a next record, in one illustrative embodiment. If a determination is made that the record is to be purged, the process then determines whether the record has integration points with other records (step 310). A record may have one or more integration points with one or more other records in the mirrored database, for example. These integration points may cause a document that would otherwise be purged to be masked instead in order to maintain the integrity of the related other documents, in one illustrative example.

If a determination is made that the record does not have integration points with other records, the process proceeds to step 314 and purges the record from the mirrored database (step 314). If a determination is made that the record does have integration points with other records, the process then determines whether the number of integration points for the record is above a threshold (step 312). The threshold may be a configurable threshold customized for an individual business unit and/or company, for example. In other illustrative embodiments, the threshold may be a default threshold.

If a determination is made that the number of integration points for the record is not above a threshold, the process proceeds to step 314 and purges the record from the mirrored database (step 314). If a determination is made that the number of integration points for the record is above a threshold, the process then masks the record in the mirrored database (step 316), with the process terminating thereafter.

The process in FIG. 3 is provided for illustrative purposes, and is not intended to limit the architecture or order in which different steps may be implemented. For example, the process in FIG. 3 may run iteratively until all records in the mirrored database have been processed before terminating.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The flowcharts and block diagrams in the different depicted embodiments illustrate example architecture, functionality, and operation of some possible implementations of apparatus, methods and computer program products. In this regard, each block in the flow diagram or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current methodologies in divestiture processes use a data distillery and migration approach. This approach can result in missing configuration and settings data, missing master and transactional data, primary and secondary table inconsistencies, missing system enhancements, missing table indices, insufficient testing simulations, and insufficient customization.

Thus, the different advantageous embodiments provide an integrated enterprise resource planning system approach using database level replication technology that can be combined with a hybrid approach between customizable data masking and data purging or customizable data integration.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

EXAMPLE OPERATING ENVIRONMENT

Figure 4:
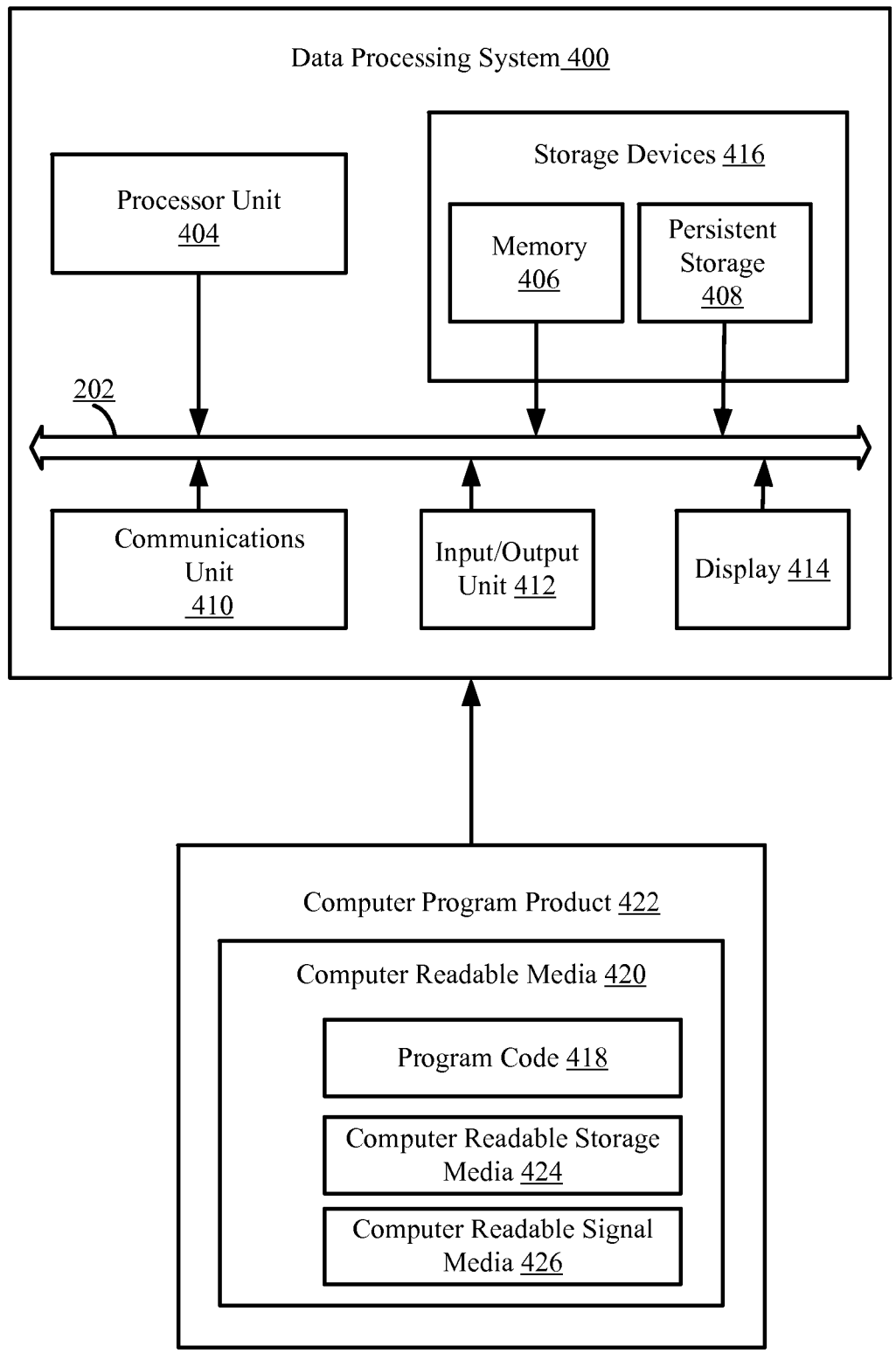
FIG. 4 is a block diagram representing an example computing environment into which aspects of the subject matter described herein may be incorporated.

With reference now to FIG. 4, an illustrative example of a suitable computing and networking environment is provided, into which the examples and implementations of any of FIGS. 1-3 as well as any alternatives may be implemented. The data processing system 400 is only one example of a suitable computing environment and is not intended to suggest any limitation as to the scope of use or functionality of the invention. Neither should the data processing system 400 be interpreted as having any dependency or requirement relating to any one or combination of components illustrated in the example data processing system 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. A number as used herein with reference to an item means one or more items. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 may be a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage medium 424 or computer readable signal medium 426. Computer readable storage medium 424 may include, for example, an optical or magnetic disc that is inserted or placed into a drive or other device that is part of persistent storage 408 for transfer onto a storage device, such as a hard drive that is part of persistent storage 408. Computer readable storage medium 424 also may take the form of a persistent storage, such as a hard drive, a thumb drive, or a flash memory that is connected to data processing system 400. In some instances, computer readable storage media 424 may not be removable from data processing system 400. In these illustrative examples, computer readable storage medium 424 is a non-transitory computer readable storage medium.

Alternatively, program code 418 may be transferred to data processing system 400 from computer readable media 420 using computer readable signal media 426. Computer readable signal media 426 may be, for example, a propagated data signal containing program code 418. For example computer readable signal media 426 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408 and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
one or more processors;
an enterprise resource planning system implemented on the one or more processors; and
a customizable toolset implemented on the enterprise resource planning system and configured to process data to determine whether to purge a subset of the data or mask the subset of the data based on a flag associated with the subset of the data, the customizable toolset including:
a configuration table, wherein the flag associated with the subset of the data is stored in the configuration table; and
a class of programs, the class of programs operating to:
determine whether the flag associated with the subset of the data indicates that the record is to be purged or masked;
responsive to a determination that the record is to be purged, determining whether the subset of the data has a number of integration points with other subsets of the data that is above a threshold;
responsive to a determination that the number of integration points with the other subsets of the data is above the threshold, masking the subset of the data; and
responsive to a determination that the number of integration points is below the threshold, purging the subset of the data; and
responsive to a determination that the subset of the data does not have integration points with other records, purging the record.

2. The system of claim 1 further comprising:
a business database, wherein the customizable toolset is further configured to replicate the business database to generate a mirrored database, and wherein the data from the mirrored database is processed by the customizable toolset.

3. The system of claim 1 wherein the class of programs includes at least one of a database replication component, a data purging component, and a dynamic data masking component.

4. The system of claim 1 wherein the class of programs uses the configuration table to select the subset of the data to be purged.

5. The system of claim 1 wherein the class of programs uses the configuration table to select the subset of the data to be masked.

6. The system of claim 1 wherein the enterprise resource planning system further comprises:
a workbench, including a class builder and a class editor, the customizable toolset configured to be loaded into the class builder and customized using the class editor.

7. The system of claim 1 wherein the enterprise resource planning system further comprises:
tables, including a table display and a table editor, the customizable configuration table configured to be loaded into the table display and customized using the table editor.

8. A method implemented on one or more processors, the method comprising:
identifying, by a class of programs implemented on the one or more processors, a subset of data in a database;
locating a record identifier for the subset of data in one or more configuration tables;
identifying a flag associated with the record identifier; and
determining whether the flag associated with the record identifier for the subset of the data indicates that the record is to be purged or masked;
responsive to a determination that the subset of the data is to be purged, determining whether the subset of the data has a number of integration points with other subsets of the data that is above a threshold;
responsive to a determination that the number of integration points with the other subsets of the data is above the threshold, masking the subset of the data in the database;
responsive to a determination that the number of integration points for the record is below the threshold, purging the subset of the data in the database; and
responsive to a determination that the subset of the data does not have any integration points with the other subsets of the data, purging the record.

9. The method of claim 8 further comprising:
responsive to a determination that the number of integration points for the record is not above a threshold, purging the record from the database.

10. The method of claim 8 wherein the database is a mirrored database in a replicated enterprise resource planning system.

11. The method of claim 8 wherein the one or more configuration tables are part of a Repeatable Auditable Anticipatory Flexible (RAAF) Model Merger Acquisition Divestiture (RMMAD) toolset implemented on an enterprise resource planning system.

* * * * *